United States Patent
Hawker et al.

(10) Patent No.: US 10,155,212 B2
(45) Date of Patent: Dec. 18, 2018

(54) PRODUCING A LOCALIZED CONCENTRATION OF GAS BETWEEN A SURFACE OF A DEPRESSION AND AN IMPACTING JET THAT IS FORMED BY USING STATIC PRESSURE TO COLLAPSE A GAS POCKET

(71) Applicant: ISIS INNOVATION LIMITED, Oxford (GB)

(72) Inventors: Nicholas Hawker, Oxford (GB); Ronald A. Roy, Brighton, MA (US)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 717 days.

(21) Appl. No.: 14/403,019

(22) PCT Filed: May 20, 2013

(86) PCT No.: PCT/GB2013/051297
§ 371 (c)(1),
(2) Date: Nov. 21, 2014

(87) PCT Pub. No.: WO2013/175187
PCT Pub. Date: Nov. 28, 2013

(65) Prior Publication Data
US 2015/0139378 A1   May 21, 2015

Related U.S. Application Data

(60) Provisional application No. 61/651,032, filed on May 24, 2012.

(30) Foreign Application Priority Data

May 21, 2012 (GB) .................................. 1208939.7

(51) Int. Cl.
*B01J 19/08* (2006.01)
*B01J 19/00* (2006.01)
*G21B 3/00* (2006.01)

(52) U.S. Cl.
CPC .............. *B01J 19/008* (2013.01); *G21B 3/006* (2013.01); *G21B 3/008* (2013.01)

(58) Field of Classification Search
CPC .......... G21B 3/006; B01J 19/008; B01J 19/10
(Continued)

(56) References Cited

U.S. PATENT DOCUMENTS 3,417,829 A   12/1968   Acheson et al.
3,481,784 A   12/1969   Karpovich
(Continued)

FOREIGN PATENT DOCUMENTS

CN   1603772 A      4/2005
CN   102759439 A   10/2012
(Continued)

OTHER PUBLICATIONS

Nature, "Bubble fusion: silencing the hype", Mar. 8, 2006.*
(Continued)

*Primary Examiner* — Jack W Keith
*Assistant Examiner* — Daniel Wasil
(74) *Attorney, Agent, or Firm* — Cantor Colburn LLP

(57) ABSTRACT

A method of producing a localized concentration of energy including providing a pocket of gas in a non-gaseous medium and in contact with a surface. The surface includes a depression shaped so as to at least partially receive the pocket of gas. A static pressure is applied to the non-gaseous medium, with an average value greater than atmospheric pressure such that the pocket of gas collapses to form a transverse jet. The surface depression is arranged to receive the transverse jet impact such that at least some of pocket of
(Continued)

gas is trapped between the impacting jet and the surface depression. An apparatus for producing a localized concentration of energy is also provided.

22 Claims, 4 Drawing Sheets

(58) Field of Classification Search
USPC .................................. 376/100, 149; 422/128
See application file for complete search history.

(56) References Cited

U.S. PATENT DOCUMENTS

| | | | |
|---|---|---|---|
| 3,624,239 | A | 11/1971 | Fraas |
| 3,858,171 | A | 12/1974 | Pauletich |
| 3,953,617 | A | 4/1976 | Smith et al. |
| 4,333,796 | A * | 6/1982 | Flynn ...................... G21B 3/00 376/100 |
| 4,890,603 | A | 1/1990 | Filler |
| 7,445,319 | B2 | 11/2008 | Dean, Jr. et al. |
| 2003/0173307 | A1* | 9/2003 | Carlson .................... C02F 1/36 210/748.03 |
| 2003/0215046 | A1 | 11/2003 | Hornkohl |
| 2006/0043828 | A1 | 3/2006 | Tessien et al. |
| 2006/0187277 | A1 | 8/2006 | Dean, Jr. et al. |
| 2008/0037694 | A1 | 2/2008 | Dean, Jr. et al. |
| 2008/0146971 | A1 | 6/2008 | Ueblacker et al. |
| 2010/0124142 | A1 | 5/2010 | Laugharn, Jr. et al. |
| 2011/0003370 | A1* | 1/2011 | Gordon ................ B01F 5/0644 435/271 |
| 2011/0095111 | A1* | 4/2011 | Briz ......................... A23F 5/02 241/46.17 |
| 2011/0228890 | A1* | 9/2011 | Dean ....................... G21B 3/00 376/151 |
| 2012/0164113 | A1* | 6/2012 | Victor .................. C12N 5/0667 435/34 |
| 2012/0281797 | A1 | 11/2012 | Ventikos et al. |
| 2012/0288047 | A1 | 11/2012 | Ventikos et al. |
| 2012/0291765 | A1* | 11/2012 | Griggs .................... F24J 3/003 126/247 |
| 2013/0114774 | A1 | 5/2013 | Ventikos et al. |
| 2014/0042088 | A1* | 2/2014 | Yoshida .................... C02F 3/02 210/629 |
| 2014/0363855 | A1* | 12/2014 | Gordon .................... C12N 1/38 435/99 |
| 2016/0012921 | A1 | 1/2016 | Ventikos et al. |
| 2016/0019984 | A1 | 1/2016 | Ventikos et al. |

FOREIGN PATENT DOCUMENTS

| | | |
|---|---|---|
| JP | H04158200 | 6/1992 |
| JP | H061984986 | 7/1994 |
| JP | 2001193381 | 7/2001 |
| WO | 02097823 A1 | 12/2002 |
| WO | 03034441 A1 | 4/2003 |
| WO | 2011064592 A1 | 6/2011 |
| WO | 2011064594 A2 | 6/2011 |
| WO | 2011138622 A1 | 11/2011 |

OTHER PUBLICATIONS

Goverdovskii, "On prospects for bubble cavitation induced fusion", Phys. Usp. 56 423-425 (2013).*
Lindstrom, "Believable Statements of Uncertainty and Believable Science", J Radioanal Nucl Chem (2017) 311:1019-1022.*
Decorso et al.; "Erosion by Liquid Impact"; ASTM International; 1962; p. 41.
Hawker et al.; "Interaction of a Strong Shockwave with a Gas Bubble in a Liquid Medium: a Numerical Study"; J. Fluid Mech., vol. 701; 2012; pp. 59-97.
International Search Report for International Application No. PCT/GB2014/050661, International Filing Date Mar. 6, 2014, dated Jul. 4, 2014, 5 pages.
International Search Report for International Application No. PCT/GB2014/050663, International Filing Date Mar. 6, 2014, dated Jul. 4, 2014, 5 pages.
Johnsen et al.; "Shock-Induced Collapse of a Gas Bubble in Shockwave Lithotripsy"; J. Acoustical Society of America, vol. 124, No. 4; Oct. 2008; pp. 2011-2020.
Lauer et al.; "Numerical Investigation of Collapsing Cavity Arrays"; Physics of Fluids, vol. 24; 2012; pp. 1-24.
Matthujak et al.; "High Speed Jet Formation by Impact Acceleration Method"; Shock Waves, vol. 16; 2007; pp. 405-419.
Shi et al.; "Generation of High-Speed Liquid Jets by High-Speed Impact of a Projectile"; JSME Internation Journal, Series B, vol. 38, No. 2; 1995; pp. 181-190.
Shi et al.; "The Measurement of Impact Pressure and Solid Surface Response in Liquid-Solid Impact up to Hypersonic Range"; Wear, vol. 186-187; 1995; pp. 352-359.
Surov; "Interaction of a Shock Wave with a Bubble Screen"; Technical Physics, vol. 44, No. 1; Jan. 1999; pp. 37-43.
Swantek et al.; "Collapse of Void Arrays Under Stress Wave Loading"; Journal of Fluid Mechanics, vol. 649; Apr. 2010; pp. 399-427.
Written Opinion for International Application No. PCT/GB2014/050661, International Filing Date Mar. 6, 2014, dated Jul. 4, 2014, 7 pages.
Written Opinion for International Application No. PCT/GB2014/050663, International Filing Date Mar. 6, 2014, dated Jul. 4, 2014, 7 pages.
"Report of the Investigation Committee in the Matter of Dr. Rusi P. Taleyarkhan." http://news.uns.purdue.edu/x/2008b/080718PurdueReport.pdf last accessed Sep. 27, 2012.
Brenner et al., "Single-bubble sonoluminescence," Rev. Mod. Phys. v. 74, Apr. 2002 p. 425.
Ed. "Bubble fusion: silencing the hype," Mar. 8, 2006 doi: 10.1038/news060306-1 last accessed Sep. 27, 2006, arXiv:physics/0603060v2 last accessed Sep. 27, 2012.
Galonsky, "Tabletop Fusion Revisted," Science, v. 297, Sep. 6, 2002, p. 1645.
Japan Office Action for Japanese Patent Application No. 2013-508557, OA Transmission dated Mar. 10, 2015, 5 pages, non-English Translation.
Japan Office Action for Japanese Patent Application No. 2013-508557, OA Transmission dated Mar. 10, 2015, 9 pages, English Translation.
Naranjo, "Comment on Nuclear Emissions During Self-Nucleated Acoustic Cavitation", Sep. 12, 2006 arxiv: physics/0603060v2 last accessed Sep. 27, 2012.
Peplow, "Desktop Fusion is Back on the Table," Jan. 10, 2006, doi:10.1038/news060109-5 last accessed Sep. 27, 2012.
Reich, "Bubble-fusion scientist debarred from federal funding," Nature, Nov. 23, 2009, doi:10.1038/news.2009.1103 last accessed Sep. 27, 2012.
Selfie, "Bubble Fusion Paper Generates a Tempest in a Beaker," Science Mar. 8, 2002, v. 295 p. 1808.
Shapria et al., "Nuclear Fusion in Collapsing Bubbles—Is It There? An Attempt to Repeat the Observation of Nuclear Emissions from Sonoluminescence," Phys. Rev. Lett. v. 89, n. 10, Sep. 2, 2002, 104302.
Taleyarkhan et al., "Additional evidence of nuclear emissions during acoustic cavitation," Phys. Rev. E v. 69 Mar. 22, 2004, 036109.
Taleyarkhan et al., "Nuclear Emissions During Self-Nucleated Acoustic Cavitation," Phys. Rev. Lett. 96, 034301 Jan. 10, 2006.
Taleyarkhan et al., "Reply," Phys. Rev. Lett. 97 Oct. 6, 2006, 149404.
Xu et al., "Confirmatory experiments for nuclear emissions during acoustic cavitation," Nuc. Engr. Des. v. 235, Feb. 21, 2005, p. 1318-1324.
Japan Office Action for Japanese Patent Application No. 2012-540500, OA transmission dated Apr. 28, 2015, 2 pages, non-English Translation.
Japan Office Action for Japanese Patent Application No. 2012-540500, OA transmission dated Apr. 28, 2015, 3 pages, English Translation.

(56) References Cited

OTHER PUBLICATIONS

A. Philipp et al. "Cavitation erosion by single laser-produced bubbles", J. Fluid Mech., 1998, vol. 361, pp. 75-116.
B. Wolfrum et al. "Luminescence of transient bubbles at elevated ambient pressures", The American Physical Society, Sep. 25, 2001, vol. 64, pp. 046306-1-046306-5.
Bourne et al. "The temperature of a shock-collapsed cavity", Proceedings of the Royal Society London, Series A., 2003, pp. 1851-1861, vol. A, No. 459, XP000002654461, London.
Bourne, et al. Shock-induced collapse and luminescence by cavities, Philosophical Transactions of the Royal Society London, Series A., Feb. 1999, pp. 295-311, vol. 357, No. 1751, XP00000265463.
D. Felipe Gaitan et al. "Sonoluminescence and bubble dynamics for a single, stable, cavitation bubble", Journal Acoustical Society of America, Jun. 1992, pp. 3166-3183, vol. 91, No. 6.
D. Felipe Gaitan et al. "Transient cavitation in high-quality-factor resonators at high static pressures", Journal of the Acoustical Society of America, Jun. 2010, vol. 127, No. 6, pp. 3456-3465; XP002715356.
D. Shapira et al. "Nuclear Fusion in Collapsing Bubbles—Is It There? An Attempt to Repeat the Observation of Nuclear Emisions from Sonoluminescence", The American Physical Society, Physical Review Letters, Sep. 2, 2002, pp. 104302-1-104302-4, Vo.
D. Sivakumar et al. "Spreading behavior of an impacting drop on a structured rough surface", Physics of Fluids, Oct. 2005, pp. 1-10, vol. 17, No. 10, XP002633348.
Dennis Kroninger et al. "Particle tracking velocimetry of the flow field around a collapsing cavitation bubble", Exp Fluids, 2010, vol. 48, pp. 395-408.
Emil A. Brujan et al. "Properties of luminescence from laser-created bubbles in pressurized water", The American Physical Society, Dec. 21, 2005, vol. 72, No. 6, pp. 066310-1-066310-6, USA.
Eric Johnsen et al. "Numerical simulations of non-spherical bubble collapse", Journal of Fluid Mechanics, Jun. 25, 2009, vol. 629, pp. 231-262; XP002715357.
GB Office Action dated Sep. 24, 2012 re: Application No. GB1208939. 7; citing: WO 2011/138622 A1 and WO 2011/064592 A1.
International Search Report and Written Opinion dated Sep. 16, 2011 by European Patent Office re: PCT/GB2011/050889; pp. 12; citing: Tullis et al. "Cavitation Guide . . . ", Sushchikh et al. "Shock waves . . . ", Bourne et al., "The temperature . . . ", Bourn.
International Search Report and Written Opinion dated Nov. 20, 2013 re: Application No. PCT/GB2013/051297; pp. 1-11; citing: WO 2011/138622, Gaitan et al. "Transient . . . ", Johnsen et al. "Numerical . . . " and Tullis "Cavitation . . . ".
International Search Report and Written Opinion dated Apr. 28, 2011 re: PCT/GB2010/051974, pp. 11; citing US 2008/037694 A1, Rein et al. "Phenomena of liquid . . . ", Haller et al. "Computational study . . . ", Haller et al. "Wave structure . . . ", Range et al.
International Search Report dated Jun. 9, 2011 re: PCT/GB2010/051976, pp. 11; citing: Brunton "High speed liquid . . . ", Rein et al. "Phenomena of liquid . . . ", Sivakumar et al. "Spreading behavior . . . ", and US 2008/037694 A1, Dear et al. High-speed photogra.
J. H. Brunton, "High speed liquid impact", Royal Society of London Philosophical Transactions Mathematical, Physical and Engineering Sciences, the Royal Society, Jul. 28, 1966, pp. 79-85, vol. 260, London GB, XP008135518.
J. P. Dear et al. "High-speed photography of surface geometry effects in liquid/solid impact", Journal of Applied Physics, Feb. 15, 1988, pp. 1015-1021, vol. 63, No. 4, XP002633349.
J. Paul Tullis, "Cavitation Guide for Control Valves", Tullis Engineering Consultants NUREG/CR-6031, Apr. 1993, pp. 1-106, XP000002654460, http://www.iaea.org/inis/collectin/NCLCollectionStore/_Public/24/072/24072618.pdf.
K. K. Haller et al. "Computational study of high-speed liquid droplet impact", Journal of Applied Physics, American Institute of Physics, Sep. 1, 2002, pp. 2821-2828, vol. 92, No. 5, XP012057199.
K. K. Haller et al. "Wave structure in the contact line region during high speed droplet impact on a surface: Solution of the Riemann problem for the stiffened gas equation of state", Journal of Applied Physics, American Institute of Physics, Mar. 1, 20.
Kai Range et al. "Influence of surface roughness on liquid drop impact", Journal of Colloid and Interface Science, Jul. 1, 1998, pp. 16-30, vol. 203, CS985518, XP002632536.
M. Barbaglia et al. "Search of Fusion Reactions During the Cavitation of a Single Bubble in Deuterated Liquids", Physica Scripta, 2005, vol. 72, pp. 75-78, Argentina.
Martin Rein et al. "Phenomena of liquid drop impact on solid and liquid surfaces", Fluid Dynamics Research, North-Holland, Aug. 1, 1993, pp. 61-93, vol. 12, No. 2, XP024733663.
Milton S. Plesset et al. "Bubble Dynamics and Cavitation", Annual Review Fluid Mech., 1977, vol. 9, pp. 145-185; www.annualreviews.org/aroline.
Nicholas A. Hawker et al. "Shock/Gas Bubble Interactions in Infinite and Finite Volumes of Liquid", 2nd Micro and Nano Flows Confernece, Department of Engineering Science, University of Oxford, Sep. 1-2, 2009, pp. 1-5, West London UK.
R. P. Taleyarkhan et al. "Evidence for Nuclear Emissions During Acoustic Cavitation", Science, Research Articles, Mar. 2, 2002, pp. 1868-1873, vol. 295, downloaded from www.sciencemag.org on Nov. 24, 2009.
Sushchikh et al. "Shock waves and flow patterns in a shock-induced bubble collapse", American Institute of Aeronautics and Astronautics, 2005, pp. 01-12, vol. AIAAA 2005-1291, XP000002654462.
Werner Lauterborn et al. "News from bubble dynamics: high static pressures, shock waves and interior dynamics", The 19th International Symposium on Nonlinear Acoustics, 1 page.

* cited by examiner

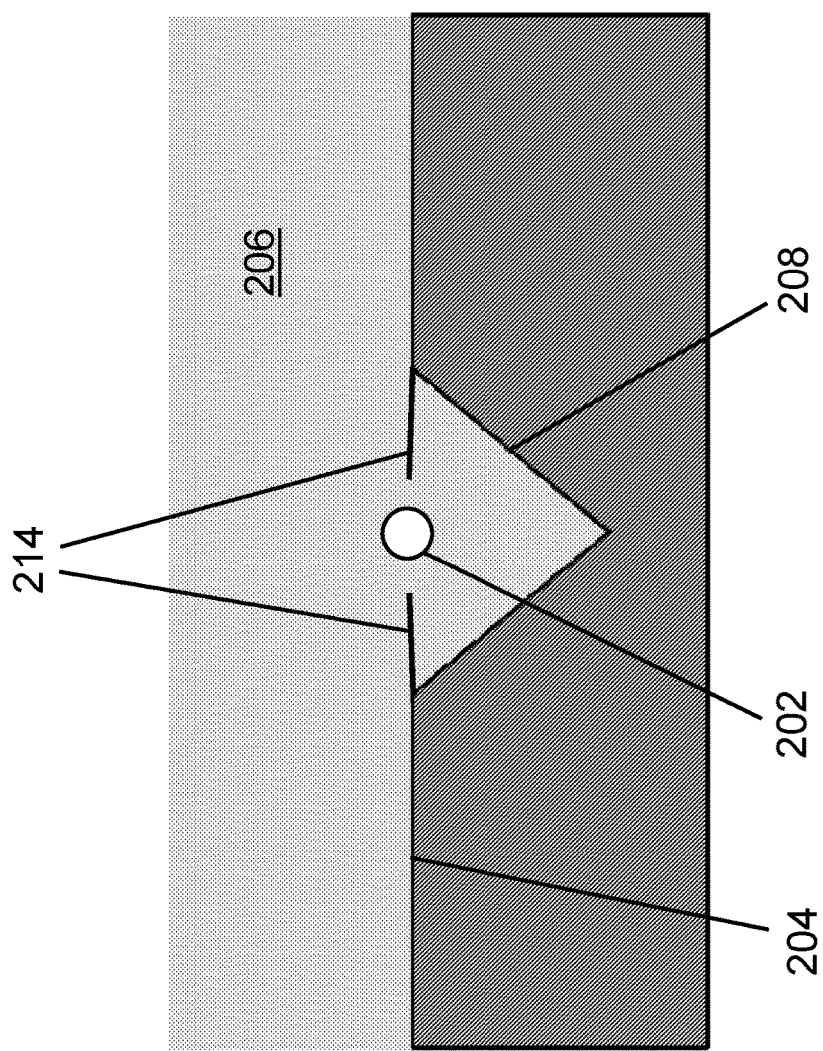

PRODUCING A LOCALIZED CONCENTRATION OF GAS BETWEEN A SURFACE OF A DEPRESSION AND AN IMPACTING JET THAT IS FORMED BY USING STATIC PRESSURE TO COLLAPSE A GAS POCKET

TECHNICAL FIELD

This invention relates to methods and apparatuses for producing very high localised energies. It relates particularly, although not exclusively, to using mechanisms of cavitation in producing a localised compression of gas, which compression generates localised energies which potentially may be high enough to cause nuclear fusion.

BACKGROUND

The development of fusion power has been an area of massive investment of time and money for many years. This investment has been largely centred on developing a large scale fusion reactor, at great cost. However, there are other theories that predict much simpler and cheaper mechanisms for creating fusion. Of interest here is the umbrella concept "inertial confinement fusion", which uses mechanical forces (such as shock waves) to concentrate and focus energy into very small areas.

Much of the confidence in the potential in alternative methods of inertial confinement fusion comes from observations of a phenomenon called sonoluminescence. This occurs when a liquid containing appropriately sized bubbles is driven with a particular frequency of ultrasound. The pressure wave causes bubbles to expand and then collapse very violently; a process usually referred to as inertial cavitation. The rapid collapse of the bubble leads to non-equilibrium compression that causes the contents to heat up to an extent that they emit light [Gaitan, D. F., Crum, L. A., Church, C. C., and Roy, R. A., *Journal of the Acoustical Society of America*, 91(6), 3166-3183 June (1992)]. There have been various efforts to intensify this process and one group has claimed to observe fusion [Taleyarkhan, R. P., West, C. D., Cho, J. S., Lahey, R. T., Nigmatulin, R. I., and Block, R. C., *Science*, 295(5561), 1868-1873 March (2002)]. However, the observed results have not yet been validated or replicated, in spite substantial effort [Shapira, D. and Saltmarsh, M., *Physical Review Letters*, 89(10), 104302 September (2002)]. This is not the only proposed mechanism that has led to luminescence from a collapsing bubble; however it is the most documented.

Luminescence has also been observed from a bubble collapsed by a strong shock wave [Bourne, N. K. and Field, J. E., *Philosophical Transactions of the Royal Society of London Series A-Mathematical Physical and Engineering Sciences*, 357(1751), 295-311 February (1999)]. It has been proposed in U.S. Pat. No. 7,445,319 to fire spherical drops of water moving at very high speed (~1 km/s) into a rigid target to generate an intense shockwave. This shockwave can be used to collapse bubbles inside the droplet. Another mechanism of using a shockwave to collapse a bubble is described in WO 2011/138622, where the present Applicants have proposed to collapse a bubble within a liquid by applying a high pressure shockwave to the liquid. Although this affords a number of advantages over previous techniques, e.g. not requiring high speed droplet impact, the apparatus needed to generate high enough pressure shockwaves can be complicated and expensive.

BRIEF SUMMARY

The present invention aims to provide alternatives to the aforementioned techniques and may also have other applications. When viewed from a first aspect the invention provides a method of using cavitation in producing a localised compression of gas comprising:

providing a non-gaseous medium having therein a pocket of gas, wherein the pocket of gas is in contact with a surface comprising a depression shaped so as to at least partially receive the pocket of gas; and applying a static pressure to the non-gaseous medium, wherein the static pressure has an average value greater than atmospheric pressure such that the pocket of gas collapses to form a transverse jet, and wherein the surface depression is arranged to receive the transverse jet impact such that at least some of pocket of gas is trapped between the impacting jet and the surface depression.

The invention also extends to an apparatus for using cavitation for producing a localised compression of gas comprising:

a non-gaseous medium having therein a pocket of gas, wherein the pocket of gas is in contact with a surface comprising a depression shaped so as to at least partially receive the pocket of gas; and means to apply a static pressure to the non-gaseous medium, wherein the static pressure has an average value greater than atmospheric pressure such that the pocket of gas collapses to form a transverse jet, and wherein the surface depression is arranged to receive the transverse jet impact such that at least some of pocket of gas is trapped between the impacting jet and the surface depression.

It will thus be appreciated that the present invention provides for a similar controlled collapse of a gas pocket as obtained in WO 2011/138622, i.e. a transverse jet traversing the gas pocket and trapping part of the gas against the surface, but without having to provide the complicated and expensive apparatus typically required for generating a high pressure shockwave. Instead, a static pressure can be controllably applied to the non-gaseous medium, and it is this elevation in ambient pressure which generates a controllable amount of energy that is delivered into the collapse of the gas pocket and hence into the jet. The level of the static pressure applied can be chosen so as to control the resulting effects and their magnitude, as will be explained further below.

As well as the higher ambient pressure which allows more energy to be stored in the non-gaseous medium such that this can be used in the collapse of the gas pocket, it has been found that at high static pressures the collapse of the gas pocket in contact with a surface is highly asymmetric, which generally leads to formation of a transverse jet of the non-gaseous medium that moves across the collapsing gas pocket. In most systems this asymmetric collapse is undesirable as it leads to instability and the formation of multiple gas pockets, e.g. bubbles which are then unusable. In accordance with the present invention, however, the inventors have appreciated that this phenomenon can be appropriately adapted and harnessed to produce a very high localised energy concentration which can be used, e.g. to potentially create nuclear fusion as will be explained later.

In the present invention the provision of a surface in contact with the gas pocket breaks the symmetry such that under a static pressure the formation of a transverse jet is in the direction of the surface, i.e. the only way for the gas pocket to collapse is for a transverse jet to be formed which traverses the gas pocket in the direction of the surface and subsequently impacts against the surface. The surface depression is designed to receive the transverse jet impact while trapping a small volume of the original gas pocket between the impacting jet and itself. The trapped portion of gas is strongly heated and this leads to various physical mechanisms that cause very substantial energy focusing in this volume of trapped gas. Preferably the gas pocket contacts the surface in the vicinity of the depression. The pocket of gas does not need to be fully in contact with the surface or fully within the depression, as long as it contacts the surface sufficiently such that when the transverse jet impacts on the leeward side of the gas pocket, this part of the pocket of gas is in contact with the surface, and does not have some of the non-gaseous medium between the gas pocket and the surface of the depression, so that a portion of the gas pocket can be trapped between the tip of the jet and the surface, thus compressing the trapped volume of gas in the depression. For example, the contact could be over a single contact patch or, by appropriate design of the surface texture, at a plurality of discrete contact points/regions.

The high speed transverse jet can, purely as an example, reach over 2000 $ms^{-1}$ for a static pressure of 200 bar applied at atmospheric pressure. When this jet strikes the surface of the depression, thus trapping at least a portion of the pocket of gas between the tip of the jet and the surface, a strong shockwave is generated within the pocket of gas by the force of the impact in a manner analogous to the high speed droplet impact situation described in U.S. Pat. No. 7,445, 319. The resultant impacting jet speed can be tailored to a desired application by appropriate selection of the static pressure applied.

What is meant by the static pressure applied to the non-gaseous medium, is the long term average pressure experienced by the non-gaseous medium, i.e. contrasting to the scenario in WO 2011/138622 in which a high pressure shockwave is applied momentarily to the non-gaseous medium. It is therefore preferable that the static pressure is applied over a timescale longer than that of a high pressure shockwave applied to the non-gaseous medium, i.e. the applied static pressure is substantially continuous. Preferably the static pressure is applied over a timescale greater than 1 ms, e.g. greater than 1 s, e.g. greater than 100 s. The atmospheric pressure is the pressure to which the non-gaseous medium would relax if the static pressure were to be removed. Generally the atmospheric pressure is around 1 bar. Of course this may vary, e.g. owing to environmental or atmospheric conditions, as well as with altitude.

The static pressure that is applied may be constant over time, however this is not necessary and in at least one set of embodiments the static pressure applied to the non-gaseous medium is varied over time. As will be discussed, these variations of the static pressure could be significant, even reaching negative pressures, however what is important is that the average pressure, taken over a timescale longer than these variations, is greater than atmospheric pressure, so that the potential energy stored in the non-gaseous medium through the static pressure can be harnessed in the collapse of the pocket of gas.

The static pressure could be generated using any known method, e.g. using a pressure vessel, which is able to maintain the average pressure of the non-gaseous medium at a level above atmospheric pressure. The Applicant has recognised that the speed of the transverse jet obtained upon collapse of the pocket of gas increases with the static pressure applied to the non-gaseous medium, e.g. scaling with the square root of the static pressure. Hence the level of static pressure to be applied may be chosen depending on the desired application of the method, i.e. the level of the static pressure is controlled to form a transverse jet having a desired speed. For some applications preferably the average value of the static pressure is at least 2 bar, further preferably at least 10 bar, e.g. at least 15 bar, e.g. at least 25 bar, e.g. at least 50 bar. For other applications, such as those that potentially may be able to allow for nuclear fusion, preferably the average value of the static pressure is at least 300 bar, e.g. at least 1 kbar, e.g. at least 2 kbar or higher. These high static pressures increase the amount of energy carried by the jet and thus the resulting temperatures and physical effects in the compressed volume of gas. Jet speeds in the realm above 1000 $ms^{-1}$ potentially may be suitable to achieve nuclear fusion in the gas, though in accordance with the invention jet speeds of greater than 5000 $ms^{-1}$ or 6000 $ms^{-1}$ may be obtained which generate very high temperatures and pressures in the compressed volume of gas. Furthermore it will be appreciated that such elevated static pressures represent much larger (and controllable) pressure changes than would be experienced by gas bubbles during cavitation in typical engineering contexts, while the jet speeds achieved are augmented by the trapping of the pocket of gas provided by the depression.

Various regimes may be applied to enhance the conditions for the collapse of the pocket of gas and the formation and control of a high speed impacting jet, in addition to the static pressure being applied. For example, the ambient temperature may also be raised.

In a set of embodiments in which the static pressure is varied, the variation could be provided by a standing pressure wave (e.g. an acoustic or ultrasonic pressure wave), or a low frequency pressure variation (e.g. applied by a piston with a slowly varying force), applied to the non-gaseous medium, i.e. superimposed on a constant pressure. This is particularly advantageous for the present invention because the constant pressure may provide the potential energy for an intense collapse of the pocket of gas while the peaks of the standing wave or pressure variation can be used to trigger the collapse of the pocket of gas, e.g. if the pressure values are arranged such that the standing wave raises the static pressure above a certain threshold for asymmetric collapse of the gas pocket. As will be explained below, a standing pressure wave or pressure variation has a number of other advantages within the scope of the present invention.

As the standing wave or pressure variation will generally be a continuous periodic drive and have a frequency, this can be chosen to collapse pockets of gas with a frequency great enough to provide a significant net energy output. Preferably the frequency of the standing wave or pressure variation is greater than 10 Hz, e.g. greater than 100 Hz, e.g. greater than 1 kHz, e.g. greater than 10 kHz, e.g. 20 kHz.

Alternatively, or in addition, a single shot pressure wave, e.g. a shockwave, could be applied to the non-gaseous medium, e.g. as in WO 2011/138622. However, because the static pressure is already applied to the non-gaseous medium, the shockwave need not necessarily be as intense as in WO 2011/138622. For example, as for the standing wave or pressure variation discussed above, the peak pressure of the shockwave could be used to trigger the collapse of the pocket of gas, but because the static pressure is already applied, the pressure on top of this applied by the shockwave does not need to be as intense as if the shockwave is applied to a non-gaseous medium at atmospheric pressure. For these reasons, the complicated and expensive apparatus needed in WO 2011/138622 would not have to be used in the present system and so a much simpler and cheaper device could be used to generate the shockwave, e.g. a piezoelectric actuator. In preferred embodiments such a piezoelectric device may create a shockwave pressure of between 10 bar and 10 kbar. The shockwave could be planar, e.g. produced by a plane wave generator, but in other embodiments the shockwave is shaped to conform to the shape of the pocket of gas. This focuses the shockwave onto the pocket of gas, resulting in a more intense collapse of the pocket of gas.

The pocket of gas could already be present within the non-gaseous medium. If a pocket of gas is already present but not in contact with the surface then the method may include moving an/or growing the gas pocket to bring it into contact with the surface (in the vicinity of a depression). However in one set of embodiments the method includes a step of providing the pocket of gas within the non-gaseous medium and the apparatus comprises means for providing a pocket of gas within the non-gaseous medium. This allows the non-gaseous medium to be held at a high static pressure such that a pocket of gas can be introduced within the non-gaseous medium and then collapsed, creating the desired high temperatures and pressures within the compressed volume of gas. It will be recognised that the introduction of a pocket of gas into a non-gaseous medium held at an elevated pressure represents an externally controlled process as compared to the natural formation of bubbles, e.g. owing to low pressures inducing cavitation. The pocket of gas may be provided so as to be in contact with the surface, e.g. nucleated as the surface, or the pocket of gas may be provided near to the surface and then expanded to bring it into contact with the surface. In one set of embodiments the pocket of gas is allowed or caused to expand after it has been provided in the non-gaseous medium, prior to being collapsed, so as to increase the energy available for the formation of a transverse jet.

Such embodiments also allow for repeatability of the process, e.g. reintroducing a pocket of gas into the non-gaseous medium after the previous pocket of gas has collapsed, and therefore in one set of embodiments the method comprises the step of repeatedly providing a pocket of gas within the non-gaseous medium. This repeatability enables, in some embodiments, the pockets of gas to collapse at a frequency which is high enough to provide a significant net energy output, i.e. from the accumulation of all the individual reactions. Preferably the frequency at which the pocket of gas is repeatedly provided within the non-gaseous medium is greater than 10 Hz, e.g. greater than 100 Hz, e.g. greater than 1 kHz, e.g. greater than 10 kHz, e.g. 20 kHz.

The means for providing the pocket of gas could comprise means for pumping a volume of gas into the non-gaseous medium, e.g. through the surface into the depression. This allows the composition of the gas to be controlled accurately as well as its volume. However this process is invasive and may interfere with the collapse of the pocket of gas and the impact of the jet against the surface. In a set of embodiments where the non-gaseous medium is a gel the gas pocket can be pre-manufactured by punching or otherwise cutting out or moulding the correct shape from the gel block to be used. Additionally or alternatively, the micro-structure or wetting characteristics of the surface can be optimised to naturally maintain a void within the non-gaseous medium.

In one set of embodiments the means for providing the pocket of gas comprises means for nucleating a pocket of gas within the non-gaseous medium. Once the pocket of gas has been nucleated it will quickly expand, e.g. over a timescale of approximately 10 µs, to a volume which can then be collapsed by the static pressure. Nucleating the pocket of gas allows it to be provided at an accurate location within the non-gaseous medium in a non-invasive manner, and techniques can be used to control the volume and composition of the pocket of gas. Furthermore, unlike pumping in a volume of gas, nucleating the pocket of gas allows it initially to be positioned away from the surface such that when the pocket of gas expands it contacts the surface before it collapses, i.e. in this embodiment the growing pocket of gas needs to displace the non-gaseous medium between it and the surface. This enables a volume of a pocket of gas to be trapped between the transverse jet and the surface. However the pocket of gas can also be nucleated next to the surface such that when it expands it is always in contact with the surface. Nucleation can also be used to provide pockets of gas within the non-gaseous medium at a high repetition rate, along with multiple pockets of gas within the non-gaseous medium at any one time. In the set of embodiments comprising a plurality of pockets of gas within the non-gaseous medium, preferably these each comprise an associated depression, i.e. the surface comprises a plurality of depressions each shaped so as to at least partially receive a pocket of gas.

There are a number of different ways by which the pocket of gas could be nucleated within the non-gaseous medium. The pocket of gas could be nucleated using an unstable emulsion of different liquids, or by using a spark, e.g. an electrical spark. This latter method is relatively inexpensive and simple, and allows precise control over the point of the nucleation. Furthermore it can help to ensure that the pocket of gas is provided in contact with the surface. A couple of electrodes may be provided, e.g. either side of or within the depression, to ignite the electrical spark, which can be small enough not to interfere with the collapse of the bubble.

However, in one set of embodiments the pocket of gas is nucleated using a laser. In the set of embodiments comprising a plurality of pockets of gas within the non-gaseous medium these are nucleated using an array of lasers. In a particular set of embodiments the pocket of gas is nucleated using a system similar to that described in U.S. Pat. No. 7,445,319, where a laser is used in conjunction with nanoparticles in the liquid to nucleate a pocket of gas. When a laser is used to nucleate the pocket of gas, the energy of the laser, the focussing of the laser and/or the duration of the laser pulse applied to the non-gaseous medium can be controlled to nucleate a pocket of gas of a certain size, e.g. so that it is centred about a particular point and in contact with the surface.

In another set of embodiments the pocket of gas is nucleated using a pressure wave applied to the non-gaseous medium to induce the cavitation of a pocket of gas within the non-gaseous medium. The pressure wave could be a standing acoustic or ultrasonic wave, or a low frequency pressure variation, applied to the non-gaseous medium, e.g. as discussed above. The decrease in pressure, which for example could be a negative pressure, in the cycle of the standing wave or pressure variation can be used to induce cavitation of the pocket of gas in the non-gaseous medium, i.e. the standing wave or pressure variation can be used to nucleate the pocket of gas and/or expand an already nucleated pocket of gas. As the standing wave or pressure variation will generally have a frequency, this can be chosen to cavitate pockets of gas such that they form and collapse with a frequency great enough to provide a significant net energy output from the accumulation of all the individual reactions. In some embodiments the non-gaseous medium, or its container, comprises a resonator, e.g. matched to the frequency of the standing wave or pressure variation. As above, preferably the frequency of the standing wave or pressure variation is greater than 10 Hz, e.g. greater than 100 Hz, e.g. greater than 1 kHz, e.g. greater than 10 kHz, e.g. 20 kHz. As will be appreciated, in the set of embodiments in which the pocket of gas is repeatedly provided within the non-gaseous medium this frequency has some relationship to the frequency of the standing wave or pressure variation. For example, these two frequencies could be equal or one could be an integer multiple of the other. Furthermore, the shape of the standing wave or pressure variation can be used to focus the pressure variations in the non-gaseous medium to allow the pocket of gas to be cavitated at the desired position relative to the surface depression.

Alternatively a negative pressure shockwave could be applied to the non-gaseous medium to induce cavitation of the gas pocket in the non-gaseous medium, i.e. to nucleate the pocket of gas, and/or to expand an already nucleated pocket of gas. This could be applied by any suitable means to the non-gaseous medium, e.g. using a piezoelectric actuator or an explosive plane wave generator, depending on the magnitude of the pressure desired. The negative pressure wave could also be created by inverting a positive pressure wave using a low acoustic impedance reflector. This could also focus the wave, enhancing its magnitude.

The Applicant notes that the scope of the present invention does not extend to usage of a shockwave or a static pressure causing an ultrasound shockwave, nor to usage of a device that generates ultrasound shockwaves (e.g. a lithotripsy device). Nor does the scope of the claimed invention include a pocket of gas being collapsed through a process of sonoluminescence. Nor does the scope of the claimed invention include a nuclear fusion reaction.

For both of these methods, i.e. applying a standing wave, pressure variation or a negative pressure wave to the non-gaseous medium, these need not be used to induce cavitation of the pocket of gas directly. In one set of embodiments the pocket of gas is nucleated within the non-gaseous medium and a standing wave, pressure variation or a negative pressure wave is applied to the non-gaseous medium. For example, if a standing wave or pressure variation is used, the pocket of gas could be nucleated or supplied at a particular point on the standing wave or pressure variation's cycle, e.g. the negative gradient part of the cycle, such that the next part of the cycle, e.g. the negative part of the cycle, is used to expand the pocket of gas. In this way the nucleation is used as a trigger to produce the pocket of gas and the pressure wave is used to help it grow to the pocket of gas. This enables control to be exercised over both the location and size of the pocket of gas.

It will be appreciated that, in the embodiments in which a pocket of gas is nucleated at a particular point in the cycle of a standing wave, pressure variation and/or a shockwave is applied to the non-gaseous medium to trigger the collapse of the gas pocket, the timings of these events will need to be precise for them to be coordinated, particularly when the system is being operated at a high repetition rate. Therefore in one set of embodiments the apparatus comprises control means to coordinate the nucleation of the gas pocket with the application of the standing wave, pressure variation and/or the shockwave, where provided. This, for example, allows the gas pocket to be nucleated at the optimum point in the standing wave or pressure variation cycle such that it can be expanded to as large as possible a volume and then collapsed by the applied static pressure and/or the shockwave when it reaches its maximum volume. The larger the gas pocket is able to grow to in the non-gaseous medium, the more potential energy it gains, therefore resulting in more energy being able to be harnessed in its collapse, i.e. an increased jet speed, leading to greater temperatures and pressures being obtained in the compressed volume of gas which is trapped between the jet and the surface.

In another set of embodiments the gas pocket is formed with the use of a pre-manufactured membrane that defines the boundary between the gas pocket and the non-gaseous medium and hence also defines the gas pockets shape. The use of a thin membrane in this manner allows a decoupling of the liquid and gas materials, allowing any choice of combination of compositions to be made. It also allows the shape and volume of the gas pocket to be controlled with a precision not available to other methods. The membrane could be formed from any suitable material, e.g. glass e.g. plastic e.g. rubber. Having a prefabricated membrane allows a liquid medium to be used more easily as the pocket of gas is trapped against the surface and therefore cannot float away or be otherwise disturbed. In a particular set of embodiments the membrane is frangible and is arranged to break upon a certain pressure being reached within the non-gaseous medium, either from the static pressure or an applied shockwave, such that it has no influence on the resulting dynamics.

In one set of embodiments the prefabricated membrane includes a line or region of weakness, so that upon the critical pressure being reached it breaks along the line or in the region of weakness. The line or region of weakness can be arranged so that the position of the breach has an influence on the ensuing flow patterns, for example this could help control the formation and dynamics of the transverse jetting. In another set of embodiments the membrane is designed to deform with the collapsing pocket of gas.

When using a membrane to define the pocket of gas, in the set of embodiments in which a pocket of gas is repeatedly provided within the non-gaseous medium, this allows the pocket of gas, or multiple pockets of gas where provided, to easily be inserted into the non-gaseous medium once the previous pocket of gas has collapsed. Multiple pockets of gas could be provided on a single membrane which is then advanced through the non-gaseous medium, e.g. one or more pockets of gas at a time are exposed to the static pressure in order to collapse them. This set of embodiments works particularly well with the set of embodiments in which a standing wave or pressure variation is applied to the non-gaseous medium. For example, the previously broken membrane can be withdrawn from and the next membrane with a new pocket of gas introduced into the non-gaseous medium during a low part of the cycle of the standing wave or pressure variation such that the pressure is below the critical pressure for breaking the membrane. Once the new pocket of gas is in place the pressure can increase so to break the membrane and collapse the pocket of gas. Thus the replacement of the membrane can to be coordinated with the variations in the standing wave or pressure variation, e.g. by the control means as discussed above. Similarly, the frequency at which the membrane is repeatedly provided within the non-gaseous medium has some relationship to the frequency of the standing wave or pressure variation. For example, these two frequencies could be equal or one could be an integer multiple of the other.

In one set of embodiments the non-gaseous medium and/or the pocket of gas are heated. Raising the ambient temperature is can help to supply more energy into the collapse of the pocket of gas, further increasing the peak temperatures and pressures obtained. This could be achieved by heating the whole volume of the non-gaseous medium and/or heating the gas introduced into the non-gaseous medium.

The shape of the surface in the depression opposite where the pocket of gas collapses could be flat so that the jet contacts the surface at a planar region. In a preferred set of embodiments however the surface depression and gas pocket are arranged such that the initial contact region between the jet and the surface is a curve which forms a closed loop—e.g. a ring. This makes it easier to trap a portion of the gas pocket between the jet tip and the edge of the depression. To achieve this, a section of the surface has a curvature greater than that of the tip of the jet and this part of the surface is placed such that the jet impacts into it. Upon impacting, a toroidal shockwave is generated whose inner edge propagates towards the base of the depression and towards the trapped portion of gas. Combining this with the 'piston' effect of the gas halting the motion of the impacting jet yields extremely strong heating of the trapped gas. For example, for a given static pressure the peak temperatures can be increased by over an order of magnitude by these arrangements as compared to a pocket of gas in contact with to a planar surface.

The depression could take a number of shapes. In a set of embodiments it tapers in cross-section away from the mouth. The depression could resemble a dish—e.g. being continuously curved. The surface need not be continuously curved however. In a set of embodiments the surface more closely resembles a crack rather than a dish shape. This could be defined by stating that the depth is greater than the width or by the presence of a region of curvature at the tip of the crack greater than the curvature (or maximum curvature) of the portion of the gas pocket received in it. In one set of embodiments the surface comprises a plurality of discrete portions, e.g. with a gradient discontinuity between them. The portions could themselves be partial ellipses, parabolas, and so on, but equally could be straight. A particular set of embodiments of surfaces made from discrete portions could be described as piecewise polynomial.

As above, the pocket of gas could be small in comparison to the dimensions of the depression such that it is attached only to one side or it could be of similar size so as to close it off, or indeed the pocket of gas could have a volume greater than that of the depression. It is not essential that there is only one depression which partly receives the gas pocket; a gas pocket could extend across, and be partially received by, a plurality of depressions, as is discussed below.

In a particular set of embodiments the high speed jet is arranged to strike an area of surface that has been prepared with a particular roughness or microscopic shape such that many small portions of the pocket of gas are trapped between the jet tip and the surface, i.e. the many small depressions are small in comparison to the size of the transverse jet tip.

Furthermore, in the set of embodiments in which a shockwave is additionally applied to the non-gaseous medium, the geometry of the surface can be used to control the reflections of the incident shockwave before it reaches the pocket of gas such that the collapse of the gas pocket is intensified, for example such that the initially incident shockwave is more conforming to the surface of the gas pocket. There are many shapes and configurations which the surface might take to provide suitable regions for the pocket of gas to contact the surface in the vicinity of a depression. The configuration of the surface will determine how the shockwave interacts with it and the shape of the surface relative to the placement and shape of the pocket of gas will determine how the shockwave interacts with the gas pocket, which it may do so before, simultaneously or after it interacts with the surface. This in turn affects the dynamics of the collapse and hence can increase temperatures and densities that are achievable through compression of the gas achieved by the static pressure and augmented by the shockwave. More details on the shape of the surfaces which are suitable for focussing a shockwave onto a pocket of gas are discussed in WO 2011/138622.

The surface contacted by the gas pocket is not limited to having a single depression (e.g. to exploit the jetting phenomenon described above) and thus in one set of embodiments, the surface comprises a plurality of depressions. Each individual depression may be shaped to encourage energy focusing by causing multiple jets to form or causing the shockwave, where provided, to converge on one or more pockets of gas. That is to say, the surface may be prepared with more than one site where a pocket of gas is in contact with a depression, thus providing infinite scalability. An advantage of employing a plurality of depressions is that a greater proportion of the energy stored by the static pressure (and optionally augmented by applying a shockwave) may be harnessed. For example, a large pocket of gas could be spread across a plurality of depressions, or smaller individual volumes of gas could be located within each individual depression. For the former case, depending upon the number of such depressions, the size of an individual depression will be significantly smaller than the size of the pocket of gas. For a larger volume of the non-gaseous medium able to accommodate a large number of depressions, this points towards simplicity of manufacturing an apparatus for producing a localised compression of gas, which compression generates localised energies which may potentially be high enough to cause fusion.

Such pluralities of depressions could be formed in a number of ways. For example, a solid surface could be drilled or otherwise machined to produce depressions or pits. In one set of embodiments, however, the depressions are created by the surface texture of the surface. For example, the surface could be blasted with an abrasive material, etched or otherwise treated to give a desired degree of surface roughness which provides, at the microscopic level, a large number of pits or depressions.

The surface could be constructed from a solid material, as implied in many of the embodiments outlined above, e.g. a metal, stiff plastic or ceramic, but it could equally well be a liquid, e.g. a heavier liquid than the non-gaseous medium such as a liquid metal. In the case of a solid, any of the proposed materials in U.S. Pat. No. 7,445,319 could be suitable. In the case of a liquid the required surface shape could be achieved in a number of ways. For example, the surface of a volume of liquid could be excited with a suitable vibration (e.g. using ultrasound or another method) to generate a wave having the desired shape. Alternatively the desired shape could be achieved through the contact angle between a liquid and a solid surface with appropriately matched wetting properties. Of course, this latter example shows that the surface could comprise a combination of solid and liquid. Where the surface comprises a liquid it will generally be denser than the non-gaseous medium.

The surface could comprise part of the wall of the container which holds the non-gaseous medium. Alternatively, or additionally, if a plurality of pockets of gas and depressions in the surface are provided, the surface could be provided by a piece of material positioned within the non-gaseous medium, e.g. suspended or otherwise arranged. By positioned the material providing the surface within the non-gaseous medium, e.g. away from the walls of the container holding the non-gaseous medium, pockets of gas can be provided on multiple surfaces of the material.

The aspects of the invention described herein provide alternatives to the techniques described in WO 2011/138622 and U.S. Pat. No. 7,445,319 which may carry their own benefits. The present inventors have recognised that there are significant challenges in the complexity and expense of a high pressure shockwave generator as suggested in WO 2011/138622, and in the nucleation of a bubble in a droplet fired at high speed into a target as suggested in U.S. Pat. No. 7,445,319. The timing will have to be very precise for the bubble to be at a favourable moment of its expand-collapse cycle when the shockwave strikes, in both of these methods. The method by which the high speed droplets are created as required by U.S. Pat. No. 7,445,319 and detailed in U.S. Pat. No. 7,380,918 is also complex and expensive. By contrast such complexity and associated expense can be avoided in accordance with at least preferred embodiments of the present invention. Thus, the various aspects of the present invention provide much simpler techniques for compressing a volume of gas entrapped in a gas pocket as an elevated static pressure simply needs to be applied to the non-gaseous medium in which the gas pocket is formed. Moreover the theoretical and computer modelling of both techniques carried out by the present inventors suggests that the method in accordance with the present invention can give pressure and temperature intensities which are an order of magnitude greater than the method detailed in U.S. Pat. No. 7,445,319.

The term "gas" as used herein should be understood generically and thus not as limited to pure atomic or molecular gases but also to include vapours, suspensions or micro-suspensions of liquids or solids in a gas or any mixture of these. The "non-gaseous medium" should be understood generically and thus could include liquids, non-Newtonian liquids, semi-solid gels, materials that are ostensibly solid until the passage of the shockwave changes their properties, suspensions or micro-suspensions and colloids. Examples include but are not limited to water, oils, solvents such as acetone, hydrogels and organogels. It should be understood that the liquid will have a greater density than the gas in the pocket.

The non-gaseous medium could be any suitable substance for applying a static pressure to, such as a liquid or a semi-solid gel. The gas pocket can then be provided by a bubble suspended within the liquid or gel medium in the required location, i.e. in contact with the surface. Using a gel or a viscous liquid has the advantage that it is easier to control the location of the bubble within the medium, compared to a lower viscosity liquid in which the buoyancy of the pocket of gas may overcome the viscosity of the liquid. As the pocket of gas is in contact with the surface, the nature of the surface, e.g. the material, and the depression(s) in it, could help to adhere the bubble to the surface. Using a gel or viscous liquid also has the advantage that it will be easier to control the detailed shape of the bubble.

Owing to the more static nature of the setup of the device when compared to U.S. Pat. No. 7,445,319, much more control can be exercised over the shape of the pocket of gas. The pocket of gas may be spherical in shape apart from where it is truncated by its attachment to the surface, for example it could be hemi-spherical. In some embodiments the pocket of gas is in contact with the surface normal to it whereas in others a different angle is required. In a superset of these embodiments the pocket of gas itself is not spherical in nature but takes a different shape that includes but is not limited to ellipsoids, cardioids, variations from spherical, cardioid or ellipsoid shape in which the surface has perturbations that could be described, for example, by a Fourier series and pockets of gas with other distinct shapes such as cones or trapezoids. It will be apparent that, for example, a conical pocket of gas would be difficult to achieve in a true liquid medium but that in the case of a gel medium this set of embodiments becomes possible and could be advantageous. In a set of such embodiments the shape of the pocket of gas and the shape of the surface can be appropriately matched, e.g. if the depression is hemispherical, the pocket of gas may be spherical.

In a preferred set of embodiments, the methods described herein are employed to produce a localised compression of gas, which compression generates localised energies which may potentially be high enough to cause nuclear fusion reactions. The fuel for the reaction could be provided by the gas in the pocket, the non-gaseous medium, or the fuel could be provided by the surface itself. In the set of embodiments in which the pocket of gas is nucleated within the non-gaseous medium, the fuel could be present initially in the non-gaseous medium and then vaporised by the nucleation to create the pocket of gas containing the fuel. Any of the fuels mentioned in U.S. Pat. No. 7,445,319 is suitable for use in the present invention.

The invention extends to a method of producing a localised compression of gas, which compression generates localised energies which may potentially be high enough to cause a nuclear fusion comprising:

providing a non-gaseous medium having therein a pocket of gas, wherein the pocket of gas is in contact with a surface comprising a depression shaped so as to at least partially receive the pocket of gas; and applying a static pressure to the non-gaseous medium, wherein the static pressure has an average value greater than atmospheric pressure such that the pocket of gas collapses to form a transverse jet, and wherein the surface depression is arranged to receive the transverse jet impact such that at least some of pocket of gas is trapped between the impacting jet and the surface depression.

The invention also extends to a reactor which potentially may be able to allow for nuclear fusion comprising:

a non-gaseous medium having therein a pocket of gas, wherein the pocket of gas is in contact with a surface comprising a depression shaped so as to at least partially receive the pocket of gas; and means to apply a static pressure to the non-gaseous medium, wherein the static pressure has an average value greater than atmospheric pressure such that the pocket of gas collapses to form a transverse jet, and wherein the surface depression is arranged to receive the transverse jet impact such that at least some of pocket of gas is trapped between the impacting jet and the surface depression.

The device in the present invention is not as restricted, regarding size, as U.S. Pat. No. 7,445,319 where the size of the droplet constrains the maximum size of the pocket of gas. It may be advantageous to have a larger apparatus where a larger volume of gas is heated. The volume of gas in each pocket may be chosen depending on the circumstances but in one set of preferred embodiments it is between $5 \times 10^{-11}$ and $5 \times 10^{-3}$ liters.

The fusion reactions which it may potentially be possible to obtain in accordance with certain embodiments of the invention could be used for net energy production (the long term research aim in this field), but the inventors have appreciated that even if the efficiency of the fusion is below that required for net energy production, the reliable fusion which may potentially be obtainable in accordance with embodiments of the invention is advantageous for example in the production of tritium which can be used as fuel in other fusion projects and is very expensive to produce using currently existing technologies. The potential fusion may also be beneficial in giving a fast and safe neutron source which has many possible applications that will be apparent to those skilled in the art.

Moreover, it is not essential in accordance with the invention to produce fusion at all. For example, in some embodiments the techniques and apparatus of the present invention may be advantageously employed as a sonochemistry or chemical reactor which can be used to access extreme and unusual conditions.

BRIEF DESCRIPTION OF THE DRAWINGS

Certain embodiments of the invention will now be described, by way of example only, with reference to the accompanying drawings, in which:

FIG. 3 shows a method of nucleating a pocket of gas in accordance with an embodiment of the invention.

DETAILED DESCRIPTION OF THE DRAWINGS

Figure 1A:
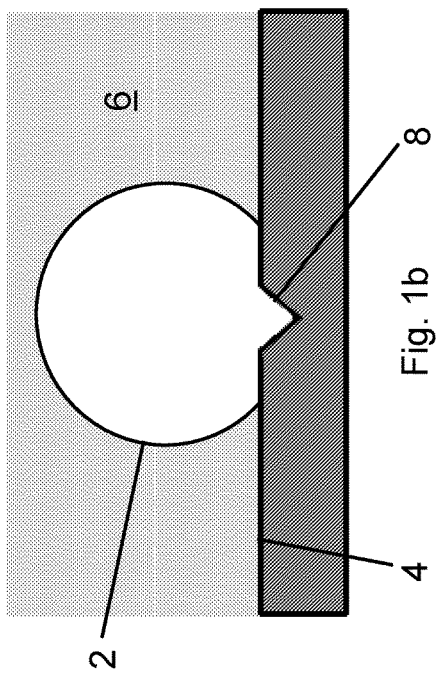
FIGS. 1a, 1b, 1c and 1d show four successive stages of the nucleation and collapse of a pocket of gas in accordance with an embodiment of the invention.

FIGS. 1a, 1b, 1c and 1d show four successive stages of the nucleation (FIG. 1a), growth (FIG. 1b) and collapses (FIGS. 1c and 1d) of a pocket of gas 2 in accordance with the invention. The apparatus comprises a solid surface 4, for example made from high strength steel, which is placed inside a non-gaseous medium 6 in the form of a hydrogel, for example a mixture of water and gelatine. The non-gaseous medium 6 also contains nanoparticles suitable for helping the nucleation of a pocket of gas 2 within the non-gaseous medium 6, and a fuel suitable for taking part in a nuclear fusion reaction.

Defined in the surface 4 is a concave depression 8, which in FIGS. 1a-1d takes the form of a V-shaped tapering depression 4 that could be machined or formed as a result of a naturally occurring crack in the surface 4. Although not shown, the non-gaseous medium 6 is held within a container, e.g. a pressure vessel, which enables a static pressure to be applied to the non-gaseous medium 6. The size of the apparatus is flexible but a typical dimension of this diagram could be between 0.1 and $1\times10^{-5}$ m.

In operation, a static pressure is applied to the non-gaseous medium 6, for instance a static pressure of 1 kbar. Using a laser (not shown), a pocket of gas 2 is nucleated within the non-gaseous medium 6, aided by the presence of nanoparticles, as shown in FIG. 1a. Owing to the energy supplied by the laser, this pocket of gas 2 contains a vaporised form of the non-gaseous medium 6 which therefore includes vaporous fuel suitable for taking part in a nuclear fusion reaction.

Figure 1B:
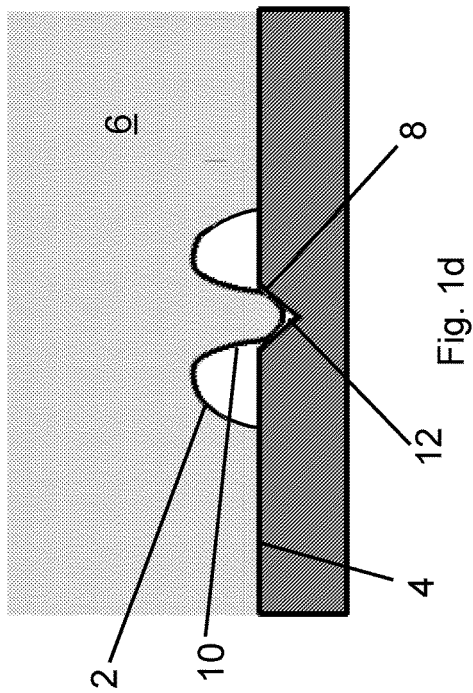
Figure 1C:
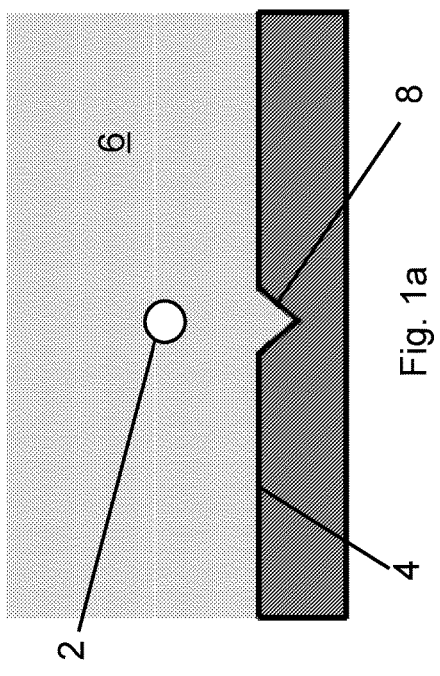
Figure 1D:
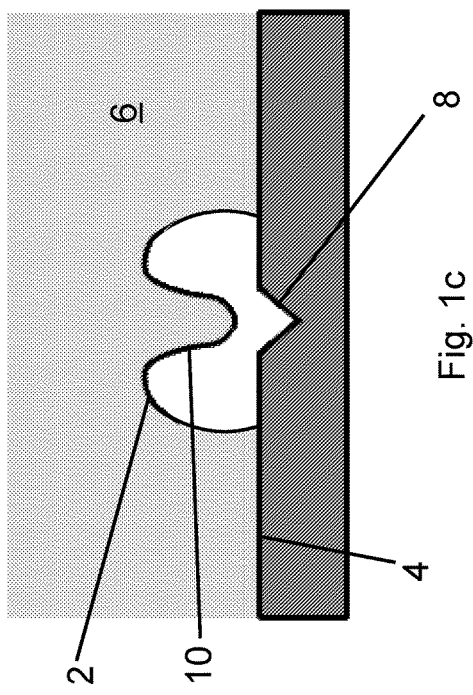

The energy supplied by the laser also causes the pocket of gas 2 to expand against the static pressure of the non-gaseous medium 6, i.e. the energy from the laser is converted into potential energy stored in the expanded pocket of gas 2 as shown in FIG. 1b. The pocket of gas 2 expands such that it comes into contact with the surface 4, thus filling the depression 8 and displacing the non-gaseous medium 6 that was previously between the pocket of gas 2 and the surface 4, i.e. as shown in FIG. 1a. The maximum volume to which the pocket of gas 2 expands is dictated by the energy supplied by the laser and the static pressure of the non-gaseous medium 6, and in this embodiment is much larger than the volume of the surface depression 8, before it collapses as shown in FIG. 1c.

Owing to the high static pressure of the non-gaseous medium 6, the pocket of gas 2 is unstable and collapses. However, owing to the presence of the surface 4 with which the pocket of gas 2 is in contact, this breaks the symmetry of the system and causes the pocket of gas 2 to collapse by forming a transverse jet 10 of the non-gaseous medium 6 which flows into the expanded pocket of gas 2 and traverses the pocket of gas 2. The transverse jet 10 accelerates across the pocket of gas 2 until it impacts in the surface depression 8, trapping a volume 12 of the pocket of gas 2 between the tip of the jet 10 and the tapering depression 8 in the surface 4. The compression of the gaseous fuel inside the trapped volume causes intense local heating which potentially may be sufficient to generate a nuclear fusion reaction.

Figure 2B:
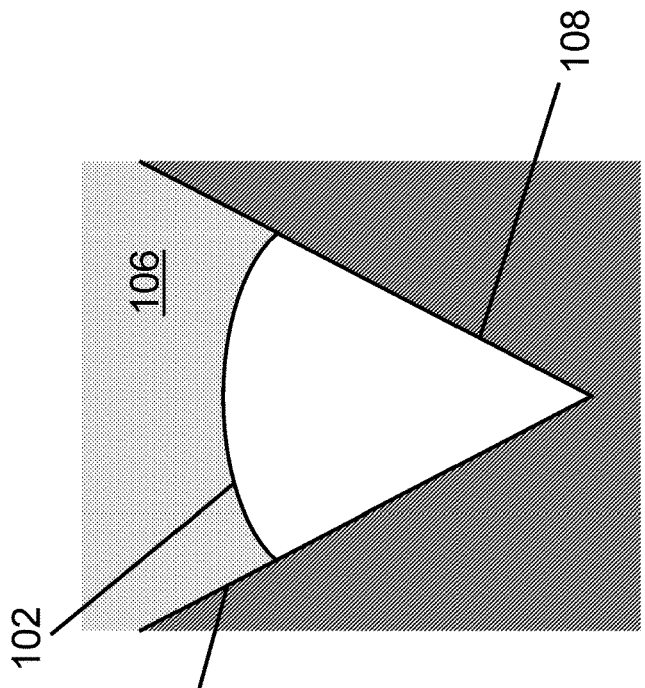
FIGS. 2a and 2b show two successive stages of the nucleation and growth of a pocket of gas in accordance with an alternative embodiment of the invention.
Figure 2A:
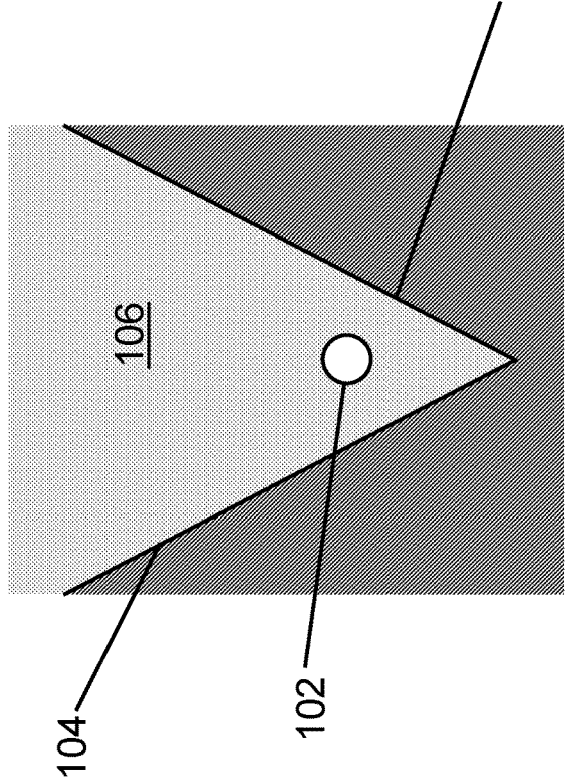

FIGS. 2a and 2b show a variant of the embodiment shown in FIGS. 1a-1d, in which the pocket of gas 102 is nucleated within a V-shaped tapering depression 108 in a surface 104. In this embodiment the volume of the depression 108 is much larger than the volume of the pocket of gas 102, even when the pocket of gas 102 expands to its maximum volume as shown in FIG. 2b. The operation of the embodiment shown in FIGS. 2a and 2b is very similar to the embodiment shown in FIGS. 1a-1d. First the volume of gas 102 is nucleated within the non-gaseous medium 106 as shown in FIG. 2a such that it then expands in volume to come into contact with the surface 104 and displaces the non-gaseous medium 106 at the bottom of the depression 108. Once the pocket of gas 102 has expanded to its maximum volume, as shown in FIG. 2b, it then collapses in the same manner as described for FIGS. 1c and 1d, thus trapping and compressing a portion of the pocket of gas 102 between the transverse jet and the tapering depression 108, creating intense local heating.

FIG. 3 shows an alternative embodiment in which the pocket of gas 202 is nucleated within the non-gaseous medium 206 using a different method. In this embodiment a pair of electrodes 214 are provided projecting from the top of the depression 208 in the surface 204. In operation a voltage pulse is applied to the electrodes 214 which creates an electric spark between the electrodes 214. This provides the energy to nucleate the pocket of gas 202, which then expands to contact the surface 204 and collapses in the same manner as has been described for the previous embodiments. Although for simplicity the same shape of depression is shown in this embodiment as is shown in FIGS. 1a-1d, any type of depression could be provided and the electrodes placed in a position to nucleate a pocket of gas at the desired location.

Figure 4B:
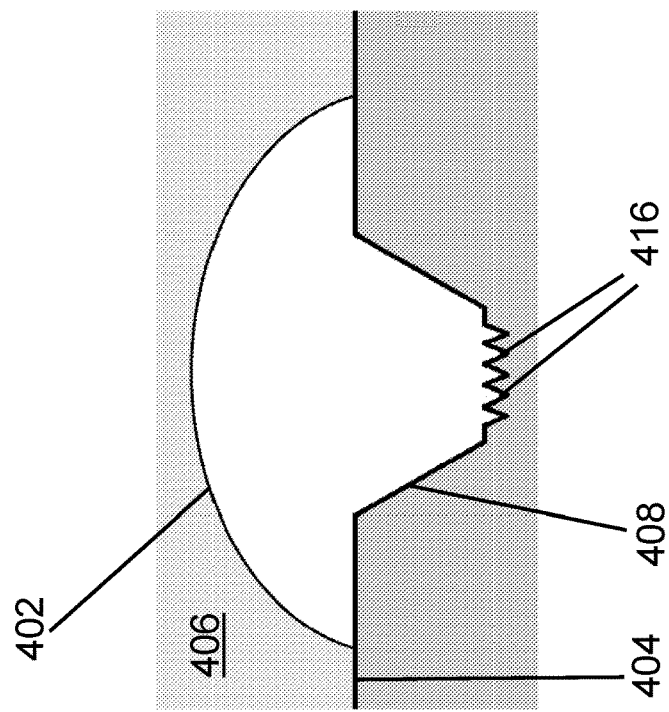
FIGS. 4a and 4b show alternative embodiments of the surface depression geometry.
Figure 4A:
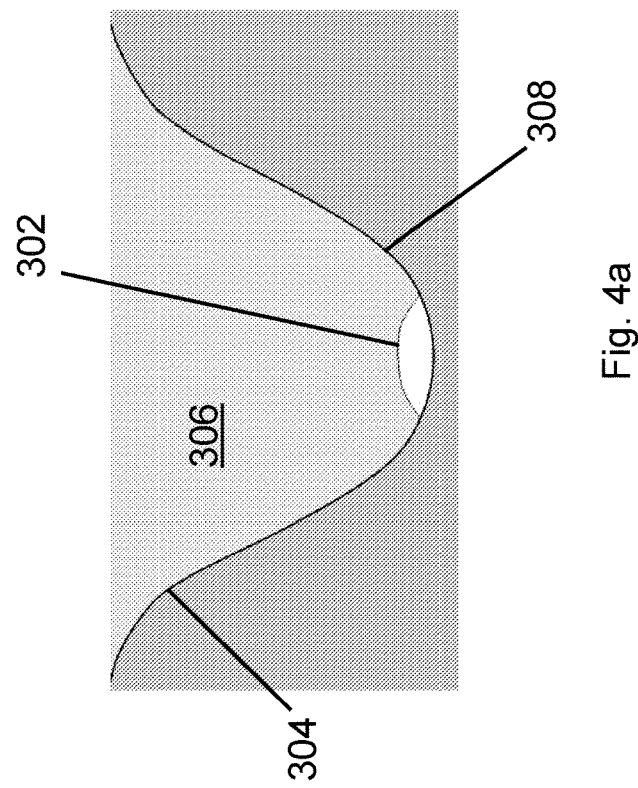

FIGS. 4a and 4b show alternative embodiments in which the surface depression has a different geometry to that shown in the previous Figures. In FIG. 4a, the surface 304 comprises a smoothly curved concave depression 308, at the bottom of which is located the pocket of gas 302 within the non-gaseous medium 306. In FIG. 4b, the depression 408 is a trapezium in the surface 404, with the pocket of gas 402 covering more than the entire depression 408. In addition, the depression 408 comprises multiple smaller depressions 416 at the bottom of the larger depression 408. These two embodiments operate in the same manner as has been described for the previous embodiments, apart from in FIG. 4b, the jet formed will trap multiple portions of the pocket of gas 402 in the multiple smaller depressions 416, causing multiple volumes of gas to be compressed and locally heated.

Although specific examples have been given, it will be appreciated that there are a large number of parameters that influence the actual results achieved, for example liquid or gel medium density, ambient pressure and temperature, composition of the pocket of gas and of the non-gaseous medium, surface or depression shape and micro-structure of the surface or depression, magnitude of the static pressure, and the application of any standing waves, pressure variations and/or shockwaves to the non-gaseous medium.

In each of the embodiments described above, the diagrams shown are a vertical cross-section through a three-dimensional volume of the gaseous medium and surface and hence they depict embodiments that are rotationally symmetric. However, this is not essential to the invention. In particular the surface could comprise discrete surface portions in the rotational direction either instead of, or as well as in the vertical cross-section shown. In the latter case the surface would be multi-facetted. Each facet could give rise to separate but converging shockwaves.

In numerical modelling of the experiment, the techniques described herein give rise to a peak pressure of ~200 kbar which is sufficient to cause temperatures inside the collapsed volume of gas in excess of $1\times10^6$ Kelvin which potentially may be sufficient for a nuclear fusion reaction. In some non-limiting examples the resulting neutrons could be used in other processes, or could be absorbed by a neutron absorber for conversion of the kinetic energy of the neutrons to thermal energy and thus conventional thermodynamic energy generation.

The invention claimed is:

1. A method of using cavitation in producing a localised compression of gas comprising:
    providing a non-gaseous medium having therein a pocket of gas, wherein the pocket of gas is in contact with a depression in a surface, wherein the depression is shaped so as to at least partially receive the pocket of gas; and
    applying a static pressure to the non-gaseous medium, wherein the static pressure has an average value greater than atmospheric pressure such that the applied static pressure causes the pocket of gas in contact with the depression to collapse via mechanisms of cavitation, wherein the collapse of the pocket of gas causes a jet of the non-gaseous medium to form that traverses the pocket of gas towards and impacts against a surface of the depression, and wherein the surface of the depression is arranged to receive the jet impact such that at least some of the gas from the original pocket of gas is trapped by the impacting jet against the surface of the depression, wherein the gas trapped by the impacting jet against the surface of the depression is compressed responsive to the mechanisms of cavitation, wherein the mechanisms of cavitation are enhanced by the applied static pressure.

2. A method as claimed in claim 1, wherein the static pressure is applied over a timescale greater than 1 ms.

3. A method as claimed in claim 1, wherein the average value of the static pressure is at least 2 bar.

4. A method as claimed in claim 1, comprising controlling the level of the static pressure to form a transverse jet having a desired speed.

5. A method as claimed in claim 1, wherein the static pressure applied to the non-gaseous medium is varied over time.

6. A method as claimed in claim 5, wherein the variation in the static pressure is provided by a standing pressure wave or pressure variation applied to the non-gaseous medium.

7. A method as claimed in claim 6, wherein the frequency of the standing wave or pressure variation is greater than 10 Hz.

8. A method as claimed in claim 1, wherein a single shot pressure wave or shockwave is additionally applied to the non-gaseous medium.

9. A method as claimed in claim 1, comprising providing the pocket of gas within the non-gaseous medium.

10. A method as claimed in claim 9, comprising allowing or causing the pocket of gas to expand within the non-gaseous medium.

11. A method as claimed in claim 9, comprising repeatedly providing a pocket of gas within the non-gaseous medium.

12. A method as claimed in claim 11, wherein the frequency at which the pocket of gas is repeatedly provided within the non-gaseous medium is greater than 10 Hz.

13. A method as claimed in claim 9, comprising nucleating the pocket of gas within the non-gaseous medium.

14. A method as claimed in claim 13, comprising using a laser to nucleate the pocket of gas.

15. A method as claimed in claim 13, comprising using a spark to nucleate the pocket of gas.

16. A method as claimed in claim 13, comprising applying a standing wave or pressure variation to the non-gaseous medium to nucleate the pocket of gas and/or to expand an already nucleated pocket of gas.

17. A method as claimed in claim 13, comprising applying a negative pressure shockwave to the non-gaseous medium to nucleate the pocket of gas, and/or to expand an already nucleated pocket of gas.

18. A method as claimed in claim 17, wherein the negative pressure shockwave is created by inverting a positive pressure wave using a low acoustic impedance reflector.

19. A method as claimed in claim 1, wherein the gas pocket is formed with the use of a pre-manufactured membrane that defines the boundary between the gas pocket and the non-gaseous medium.

20. A method as claimed in claim 1, comprising providing a non-gaseous medium having therein a plurality of pockets of gas.

21. A method as claimed in claim 20, wherein the surface comprises a plurality of depressions each shaped so as to at least partially receive a pocket of gas.

22. A method as claimed in claim 1, comprising heating the non-gaseous medium and/or the pocket of gas.

* * * * *